(12) United States Patent
Kawasaki et al.

(10) Patent No.: US 11,455,428 B2
(45) Date of Patent: *Sep. 27, 2022

(54) DATA REGISTRATION SYSTEM

(71) Applicant: HONDA MOTOR CO., LTD., Tokyo (JP)

(72) Inventors: Shunsuke Kawasaki, Tokyo (JP); Koji Sengoku, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 472 days.

This patent is subject to a terminal disclaimer.

(21) Appl. No.: 16/284,617

(22) Filed: Feb. 25, 2019

(65) Prior Publication Data
US 2019/0266356 A1    Aug. 29, 2019

(30) Foreign Application Priority Data

Feb. 27, 2018  (JP) .............................. JP2018-033150

(51) Int. Cl.
*G06F 21/62* (2013.01)
*H04L 9/06* (2006.01)
*H04L 9/08* (2006.01)

(52) U.S. Cl.
CPC ........ *G06F 21/6272* (2013.01); *H04L 9/0618* (2013.01); *H04L 9/088* (2013.01); *H04L 2209/30* (2013.01)

(58) Field of Classification Search
CPC ... G06F 21/6272; H04L 9/0618; H04L 9/088; H04L 2209/30
See application file for complete search history.

(56) References Cited

U.S. PATENT DOCUMENTS

| 7,620,670 | B2* | 11/2009 | Tokuda | ................... G06F 16/10 |
| 8,060,745 | B2* | 11/2011 | Glickman | ........... H04L 63/0435 713/168 |
| 9,641,329 | B2* | 5/2017 | Takahashi | ............. H04L 9/0894 |

(Continued)

FOREIGN PATENT DOCUMENTS

| EP | 3223466 A1 * | 9/2017 | ............. H04L 12/66 |
| EP | 3297247 A1 * | 3/2018 | ........... H04L 9/0838 |

(Continued)

OTHER PUBLICATIONS

Japanese Office Action corresponding to JP Application No. 2018-033150, dated Sep. 28, 2021.

*Primary Examiner* — Yin Chen Shaw
*Assistant Examiner* — Alex D Carrasquillo
(74) *Attorney, Agent, or Firm* — Squire Patton Boggs (US) LLP

(57) ABSTRACT

Provided is a data registration system capable of efficiently registering data related to a vehicle while enhancing confidentiality. The data registration system includes an integration processing server and an integrated database server. The integration processing server creates a data mart having weather data, vehicle condition data, vehicle movement status data, fuel economy data, navigation data, a vehicle ID, and a user ID which are linked to one another and creates an encrypted data mart by encrypting the vehicle ID and the user ID in the data mart. The integrated database server stores the encrypted data mart as registered data in a storage region.

5 Claims, 6 Drawing Sheets

(56) References Cited

U.S. PATENT DOCUMENTS

| | | | |
|---|---|---|---|
| 11,146,390 B2 * | 10/2021 | Chu | H04L 9/0847 |
| 2006/0193470 A1 * | 8/2006 | Williams | H04L 9/0894 |
| | | | 380/259 |
| 2007/0055895 A1 * | 3/2007 | Okuda | G06F 21/10 |
| | | | 713/193 |
| 2009/0169000 A1 * | 7/2009 | Shintani | H04N 21/43853 |
| | | | 380/210 |
| 2010/0241870 A1 * | 9/2010 | Ito | H04L 9/0872 |
| | | | 713/189 |
| 2011/0260884 A1 * | 10/2011 | Yi | G07C 5/008 |
| | | | 340/870.02 |
| 2016/0003621 A1 * | 1/2016 | Koenig | G06F 3/04845 |
| | | | 701/31.4 |
| 2017/0180989 A1 * | 6/2017 | Etzel | H04L 9/088 |
| 2018/0091596 A1 * | 3/2018 | Alvarez | H04L 67/12 |
| 2019/0158281 A1 * | 5/2019 | Han | G06F 11/1448 |
| 2019/0266816 A1 * | 8/2019 | Sengoku | G08G 1/127 |

FOREIGN PATENT DOCUMENTS

| | | |
|---|---|---|
| JP | 2005-202520 A | 7/2005 |
| JP | 2017-027545 A | 2/2017 |
| JP | 2017-063381 A | 3/2017 |
| WO | WO-2018026030 A1 * 2/2018 | ........... H04L 63/065 |

* cited by examiner

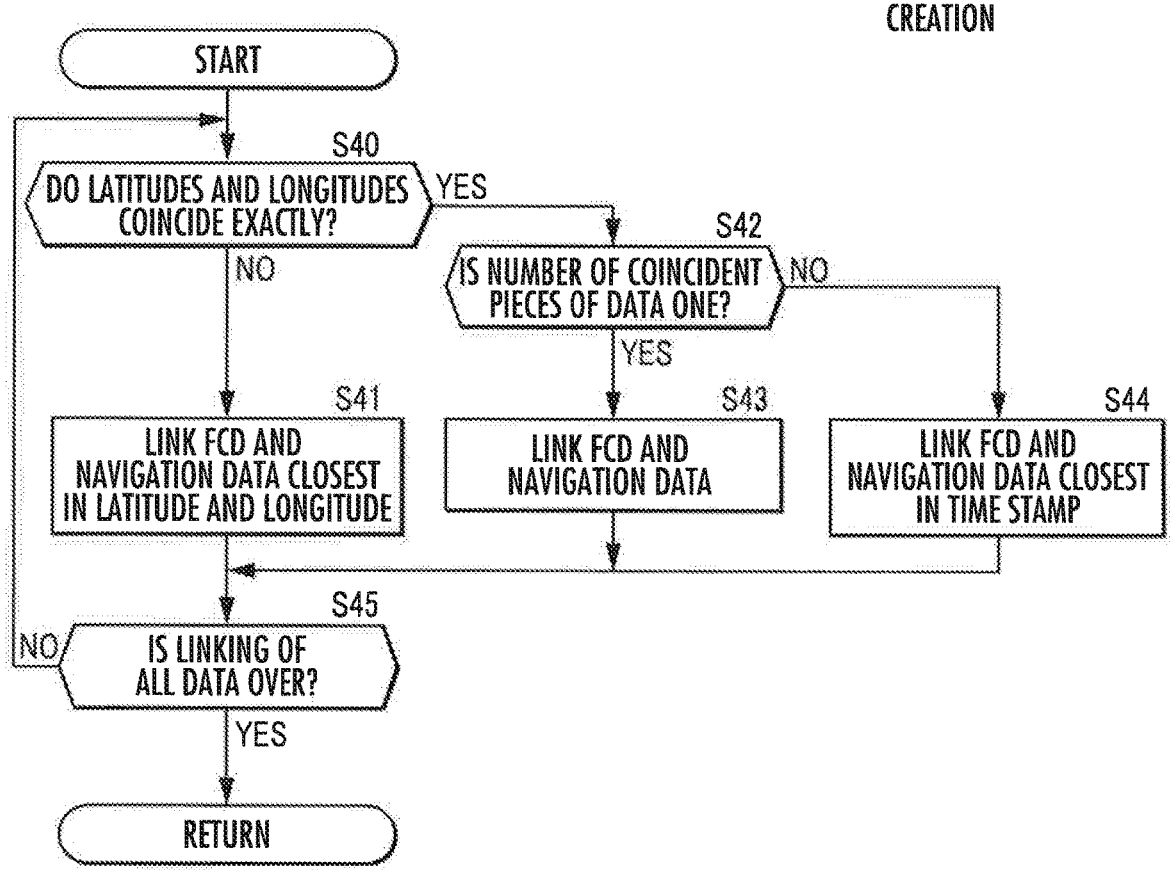

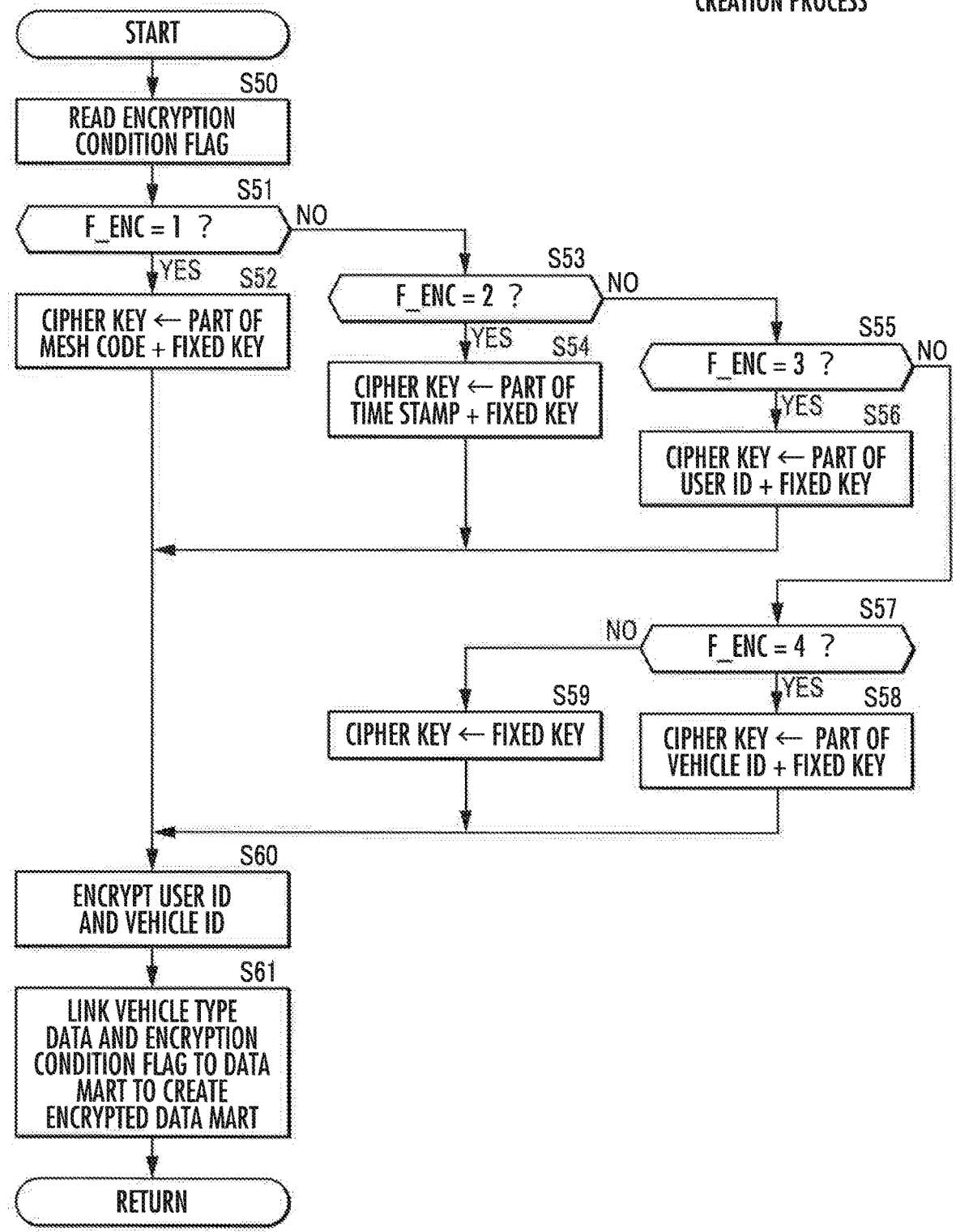

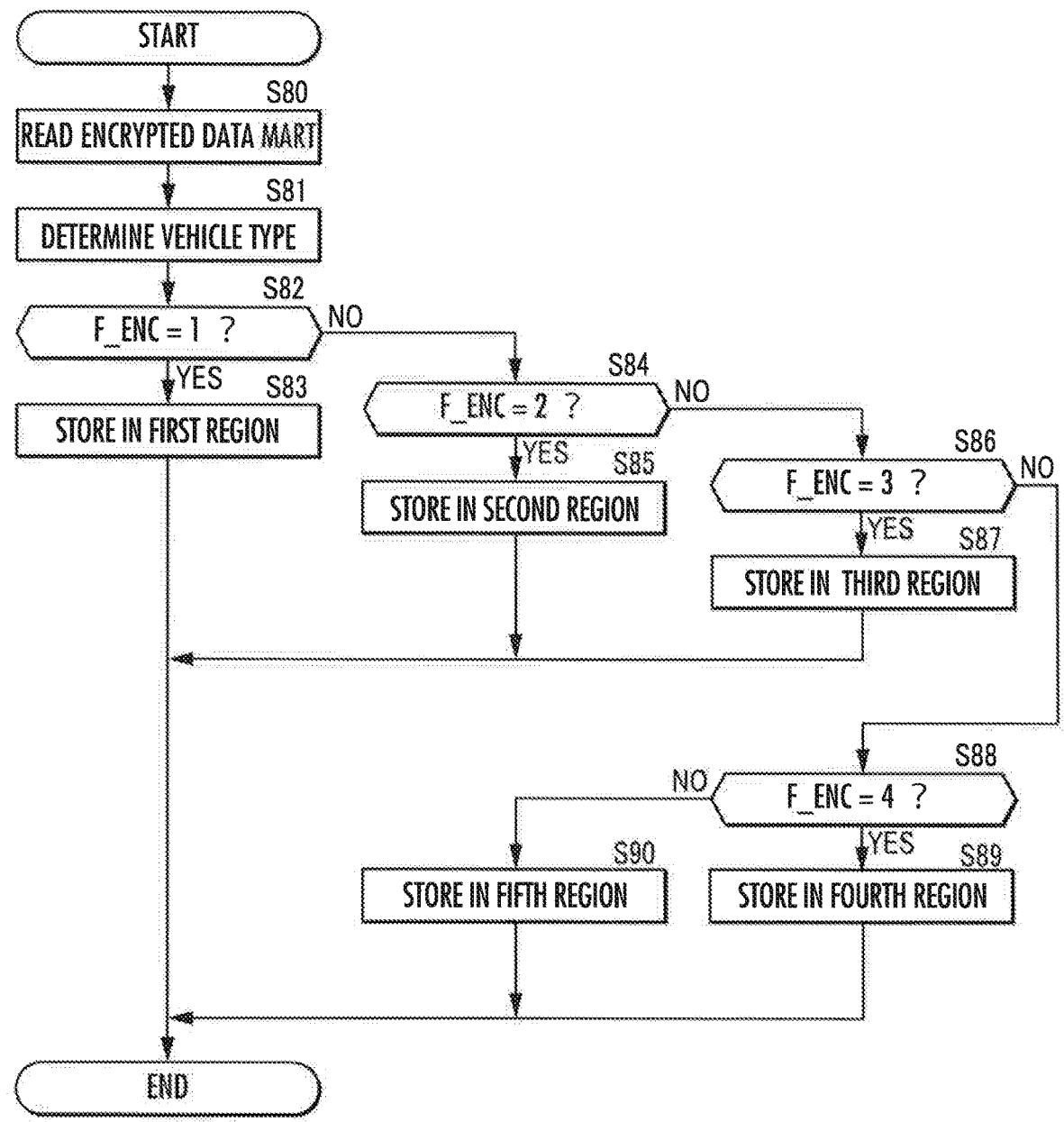

DATA REGISTRATION SYSTEM

BACKGROUND OF THE INVENTION

Field of the Invention

The present invention relates to a data registration system for registering vehicle-related data input via a network.

Description of the Related Art

As a management system for vehicle operation data, one disclosed in Japanese Patent Laid-Open No. 2017-27545 has been known. The management system comprises an on-vehicle device and an operation management device. The on-vehicle device acquires, as operation data, a running speed, a running distance, an acceleration, a geographical position, a driving operation, a fuel jet quantity, and the like of a vehicle from various types of devices and various types of sensors of a vehicle.

The on-vehicle device links (associates) operation data to (with) identification information for identification of a driver and stores the linked data and information since the start of obtaining operation data, and transmits the linked operation data and identification information to the operation management device when a finish operation is performed by a driver.

SUMMARY OF THE INVENTION

There has recently been a need to sequentially register pieces of data to form big data and analyze and utilize the big data in various fields. The same applies to vehicle-related data. In contrast, the management system in Japanese Patent Laid-Open No. 2017-27545 is not premised on utilization of pieces of data by forming the pieces of data into big data and suffers the problem of the incapability of efficiently registering highly effective data. Additionally, registration of vehicle-related data requires high confidentiality and a high level of security due to its nature. In contrast, the management system in Japanese Patent Laid-Open No. 2017-27545 is not considered in terms of data security and suffers the problem of low confidentiality.

The present invention has been made to solve the above-described problems, and the object of the present invention is to provide a data registration system capable of efficiently registering data related to a vehicle while enhancing confidentiality.

In order to attain the above-described object, a data registration system according to the present invention comprises a data reception unit to which a plurality of types of data related to a vehicle and vehicle-identifying data for identification of at least one of the vehicle and an owner of the vehicle are input over a network, a data group creation unit which creates a data group in which the plurality of types of data and the vehicle-identifying data are linked to one another, an encrypted data group creation unit which creates an encrypted data group by encrypting at least the vehicle-identifying data in the data group using a predetermined encryption algorithm, and a data storage unit which stores the encrypted data group as registered data in a storage region.

According to the data registration system, the plurality of types of pieces of data related to the vehicle and the piece of vehicle-identifying data for identification of at least one of the vehicle and a user of the vehicle are input, and the data group having the plurality of types of pieces of data and the piece of vehicle-identifying data that are linked to one another is created. The piece of vehicle-identifying data that is intended to identify the vehicle and/or the user of the vehicle requires high confidentiality. Since the encrypted data group is created by encrypting at least the piece of vehicle-identifying data, and the encrypted data group is stored as the piece of registered data, high confidentiality required by the piece of vehicle-identifying data can be appropriately ensured.

According to the present invention, preferably, the plurality of types of data include vehicle movement status data representing a time-series movement status of the vehicle, consumption rate data representing an energy consumption rate of the vehicle, navigation data representing a computation result and a setting state in a navigation device of the vehicle, and weather data representing weather in a region in which the vehicle existed.

According to the data registration system, a data group having the piece of vehicle-identifying data, the piece of vehicle movement status data, the piece of consumption rate data, the piece of navigation data, and the piece of weather data that are linked to one another is created. In this case, the piece of vehicle-identifying data is intended to identify the vehicle and/or the user of the vehicle, and the piece of vehicle movement status data, the piece of consumption rate data, the piece of navigation data, and the piece of weather data represent the time-series movement status of the vehicle, the energy consumption rate of the vehicle, the computation result and the setting in the navigation device of the vehicle, and the weather in the region that is the previous location of the vehicle, respectively. The data group having the pieces of data linked to one another is highly effective at the time of forming pieces of data related to the vehicle into big data and analyzing the big data. It is thus possible to efficiently register such highly effective data while enhancing confidentiality.

According to the present invention, preferably, the plurality of types of data further include vehicle condition data representing at least one of a manufacturing condition and a repair condition of the vehicle.

According to the data registration system, a data group is created by linking the piece of vehicle condition data representing at least one of the manufacturing condition and the repair condition of the vehicle to the piece of vehicle-identifying data, the piece of vehicle movement status data, the piece of consumption rate data, the piece of navigation data, and the piece of weather data as the group such that the pieces of data are linked to one another. This allows further enhancement of effectiveness of the data group at the time of forming pieces of data into big data and analyzing the big data.

According to the present invention, preferably, the data group creation unit creates a first data group having the vehicle-identifying data, the vehicle movement status data, and the consumption rate data that are linked to one another, a second data group having the vehicle-identifying data, the vehicle movement status data, and the navigation data that are linked to one another, a third data group having the vehicle movement status data and the weather data that are linked to each other, and a fourth data group having the vehicle-identifying data, the vehicle movement status data, and the vehicle condition data that are linked to one another, and creates the data group using the first to fourth data groups.

According to the data registration system, the first data group having the piece of vehicle movement status data and the piece of consumption rate data that are linked to each other, the second data group having the piece of vehicle movement status data and the piece of navigation data that are linked to each other, the third data group having the piece of vehicle movement status data and the piece of weather data that are linked to each other, and the fourth data group having the piece of vehicle movement status data and the piece of vehicle condition data that are linked to each other are created, and the data group is created using the first to fourth data groups. A load at the time of data group creation can be made smaller than in a case where a data group is created in one operation.

According to the present invention, preferably, the data group creation unit creates the data group as a data group which is compressed by a predetermined compression algorithm.

According to the data registration system, since the data group is created as the data group compressed by the predetermined compression algorithm, the size of a piece of registered data can be reduced. This allows an increase in the number of pieces of registered data which can be stored in a storage region of the same size.

According to the present invention, preferably, the predetermined encryption algorithm is an encryption algorithm using a cipher key, and the encrypted data group creation unit switches the cipher key in accordance with an intended use of the registered data and encrypts the vehicle-identifying data by the encryption algorithm using the switched cipher key.

According to the data registration system, the cipher key is switched in accordance with the intended use of the piece of registered data, and the piece of vehicle-identifying data is encrypted by the encryption algorithm using the switched cipher key. Thus, the level of security can be made higher than in a case using one type of cipher key.

According to the present invention, preferably, the data storage unit switches the storage region that stores the encrypted data group in accordance with data representing the switched cipher key.

According to the data registration system, the storage region that stores the encrypted data group is switched in accordance with the piece of data representing the switched cipher key. Thus, a necessary piece of registered data can be appropriately taken out from the storage region in accordance with the intended use, and convenience can be enhanced.

BRIEF DESCRIPTION OF THE DRAWINGS

FIG. 4 is a flowchart showing an FCD-navigation provisional data mart creation process;

FIG. 5 is a flowchart showing an encrypted data mart creation process; and

FIG. 6 is a flowchart showing a data storage process.

DETAILED DESCRIPTION OF THE PREFERRED EMBODIMENT

Figure 1:
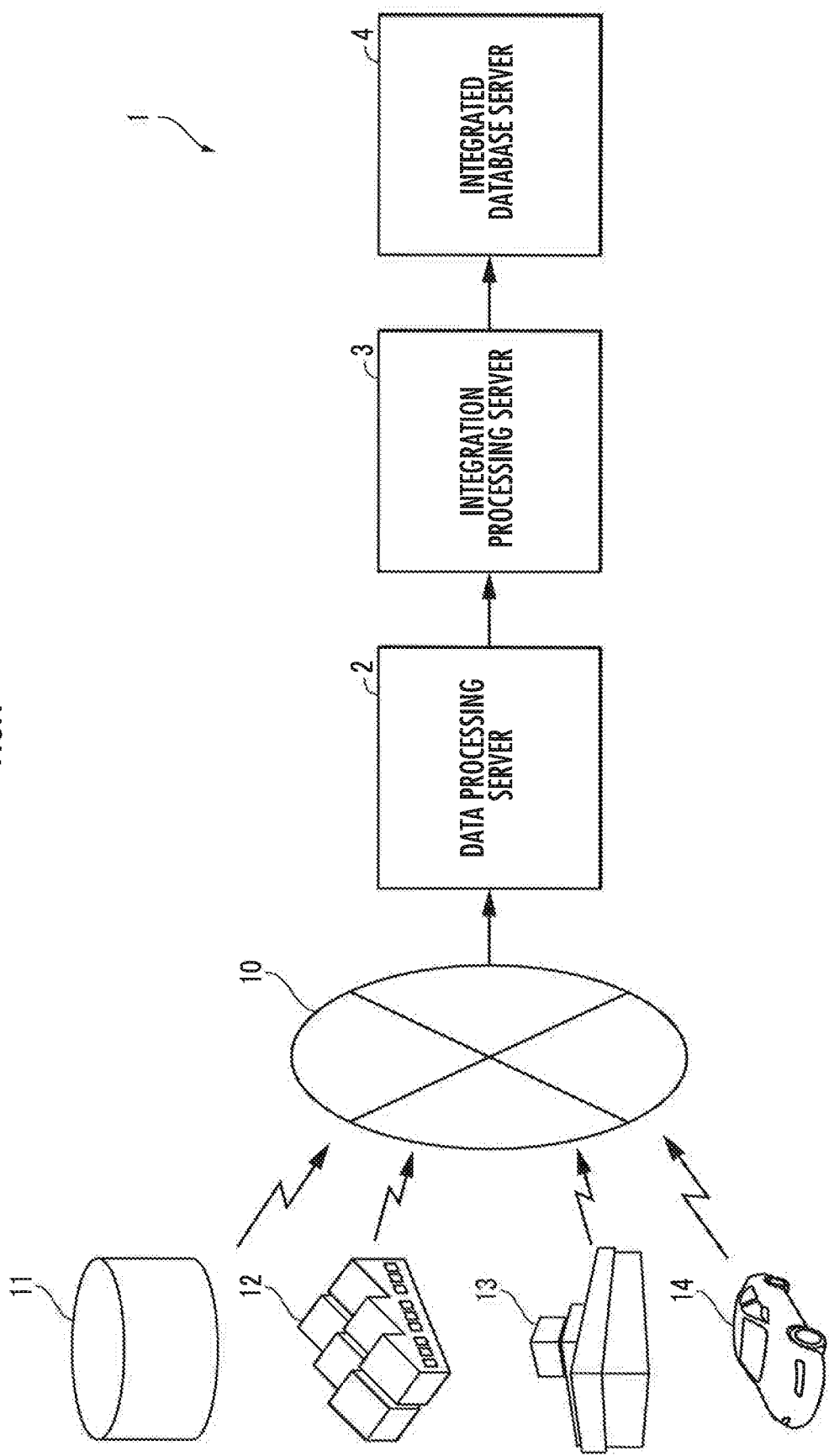
FIG. 1 is a diagram schematically showing a configuration of a data registration system according to one embodiment of the present invention.

A data registration system according to one embodiment of the present invention will be described below with reference to the drawings. As shown in FIG. 1, a data registration system 1 according to the present embodiment comprises a data processing server 2, an integration processing server 3, and an integrated database server 4.

Each of the servers 2 to 4 comprises a processor, a memory, an I/O interface, and the like and is configured to be capable of executing various types of arithmetic processing on the basis of an arithmetic program in the memory and I/O data.

The data processing server 2 executes a linked data creation process (to be described later), and the like and stores a large number of pieces of user information data in a storage region. Each piece of user information data is obtained by linking a piece of personal information of a user of a vehicle, a user registration date, a user ID, and a vehicle ID to one another and is created using the pieces of data when the pieces of data are input via an input interface (not shown) by a server administrator. Note in the present embodiment that the data processing server 2 corresponds to a data reception unit and that a user ID and a vehicle ID correspond to a piece of vehicle-identifying data.

A weather server 11, a large number of plants 12 (only one of which is shown), a large number of dealers 13 (only one of which is shown), navigation devices (not shown) of a large number of vehicles 14 (only one of which is shown), and the like are connected to the data processing server 2 over a network 10. The various types of pieces of data below are input from the elements. Note that the following description assumes that a power source of each vehicle 14 is an internal combustion engine.

More specifically, a piece of weather data is input from the weather server 11 to the data processing server 2. The piece of weather data is obtained by linking a mesh code of a country where a vehicle is used, the weather, a time stamp at the time of measurement of the weather, and the like to one another.

A piece of manufacturing data is input from each plant 12 to the data processing server 2. The piece of manufacturing data is obtained by linking a vehicle ID, a time stamp at the time of vehicle manufacture, a manufacturing plant name, a manufacturing lot number of a vehicle, and the like to one another.

A piece of dealer data is input from each dealer 13 to the data processing server 2. The piece of dealer data is obtained by linking a vehicle ID, a time stamp at the time of vehicle maintenance or repair, a dealer name, vehicle maintenance details or repair details, and the like to one another. Note that a piece of manufacturing data and a piece of dealer data will be collectively called a "piece of vehicle condition data" in the following description.

A piece of vehicle movement status data, a piece of fuel economy data, and a piece of navigation data are input from the navigation device of each vehicle 14 to the data processing server 2. The piece of vehicle movement status data, the piece of fuel economy data, and the piece of navigation data are sampled at predetermined control intervals from when an ignition switch of the vehicle 14 is turned on to when the ignition switch is turned off. Results of the sampling are input to the data processing server 2. In this case, a piece of data sampled at a time when the ignition switch is turned off is input from the navigation device to the data processing server 2 at a time when the ignition switch is turned on next time.

The piece of vehicle movement status data is obtained by linking a position (a longitude and a latitude) of the vehicle 14, a time stamp at the time of sampling of the position, and a user ID to one another. A piece of vehicle movement status data will be referred to as an "FCD" hereinafter. The piece of fuel economy data is obtained by linking the fuel economy of the vehicle 14, a time stamp at the time of sampling of the fuel economy, and the user ID to one another.

The piece of navigation data is obtained by linking respective settings for a departure place and a destination, a result of computing a latitude and a longitude of a current place and a route from the departure place to the destination, a time stamp at the time of sampling of the pieces of data, and the user ID in the navigation device of the vehicle 14 to one another.

Note that time stamps included in a piece of weather data, a piece of vehicle condition data, a piece of vehicle movement status data, a piece of fuel economy data, and a piece of navigation data when the pieces of data are input will be collectively referred to as "time stamps at the time of sampling" in the following description.

The data processing server 2 creates a piece of linked data through the linked data creation process (to be described later) and outputs the piece of linked data to the integration processing server 3.

The integration processing server 3 creates a data mart using pieces of linked data input from the data processing server 2 through a data integration process (to be described later) and encrypts the data mart to create an encrypted data mart, and outputs the encrypted data mart to the integrated database server 4. Note in the present embodiment that the integration processing server 3 corresponds to a data group creation unit and an encrypted data group creation unit and that a data mart and an encrypted data mart correspond to a data group and an encrypted data group, respectively.

The integrated database server 4 stores an encrypted data mart input from the integration processing server 3 in a storage region, as will be described later.

The linked data creation process described earlier will be described with reference to FIG. 2. The process creates pieces of linked data using various types of pieces of data (i.e., a piece of vehicle movement status data, a piece of fuel economy data, a piece of navigation data, a piece of vehicle condition data, and a piece of weather data) input to the data processing server 2 and outputs the pieces of linked data to the integration processing server 3, and is executed at predetermined control intervals ΔT (e.g., 5 minutes) in the data processing server 2.

Figure 2:
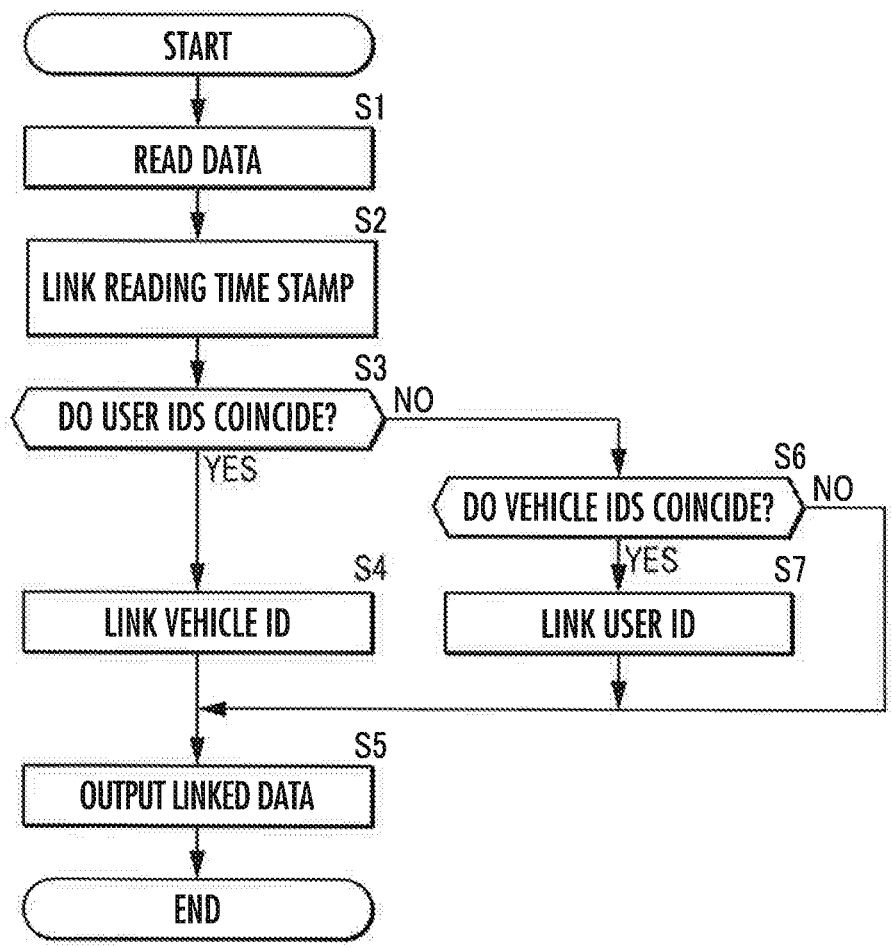
FIG. 2 is a flowchart showing a linked data creation process.

As shown in FIG. 2, each type of piece of data input to the data processing server 2 is first read (step S1 of FIG. 2). A time stamp at the time of reading (hereinafter referred to as a "reading time stamp") is linked to the type of piece of data read (step S2 of FIG. 2).

It is then judged whether a user ID in the piece of data having the reading time stamp linked thereto coincides with a user ID in a piece of user information data stored in the data processing server 2 (step S3 of FIG. 2).

If a result of the judgment is affirmative (YES in step S3 of FIG. 2), i.e., if the piece of data having the reading time stamp linked thereto is a piece of data with a user ID (an FCD, a piece of fuel economy data, or a piece of navigation data), a vehicle ID corresponding to a user ID in a coincident piece of user information data is linked to the piece of data having the reading time stamp linked thereto (step S4 of FIG. 2).

The piece of linked data (i.e., the FCD, the piece of fuel economy data, or the piece of navigation data) after the above-described linking is output to the integration processing server 3 (step S5 of FIG. 2). After that, the present process ends.

On the other hand, if the judgment result is negative (NO in step S3 of FIG. 2), i.e., if the piece of data having the reading time stamp linked thereto is a piece of data without a user ID (a piece of vehicle condition data or a piece of weather data), it is judged whether a vehicle ID in the piece of data having the reading time stamp linked thereto coincides with a vehicle ID in a piece of user information data stored in the data processing server 2 (step S6 of FIG. 2).

If a result of the judgment is affirmative (YES in step S6 of FIG. 2), i.e., if the piece of data having the reading time stamp linked thereto is a piece of vehicle condition data with a vehicle ID, a user ID corresponding to a vehicle ID in a coincident piece of user information data is linked to the piece of vehicle condition data (step S7 of FIG. 2).

The piece of linked data that is the piece of vehicle condition data after the above-described linking is output to the integration processing server 3 (step S5 of FIG. 2). After that, the present process ends.

On the other hand, if the judgment result is negative (NO in step S6 of FIG. 2), i.e., if the piece of data having the reading time stamp linked thereto is a piece of weather data without a user ID and a vehicle ID, the piece of linked data that is the piece of weather data having only the reading time stamp linked thereto is output to the integration processing server 3 without any change (step S5 of FIG. 2). After that, the present process ends.

The data integration process will be described with reference to FIG. 3. The process creates an encrypted data mart using pieces of linked data input from the data processing server 2 and outputs the created encrypted data mart to the integrated database server 4, and is executed at the predetermined control intervals ΔT described earlier in the integration processing server 3.

Figure 3:
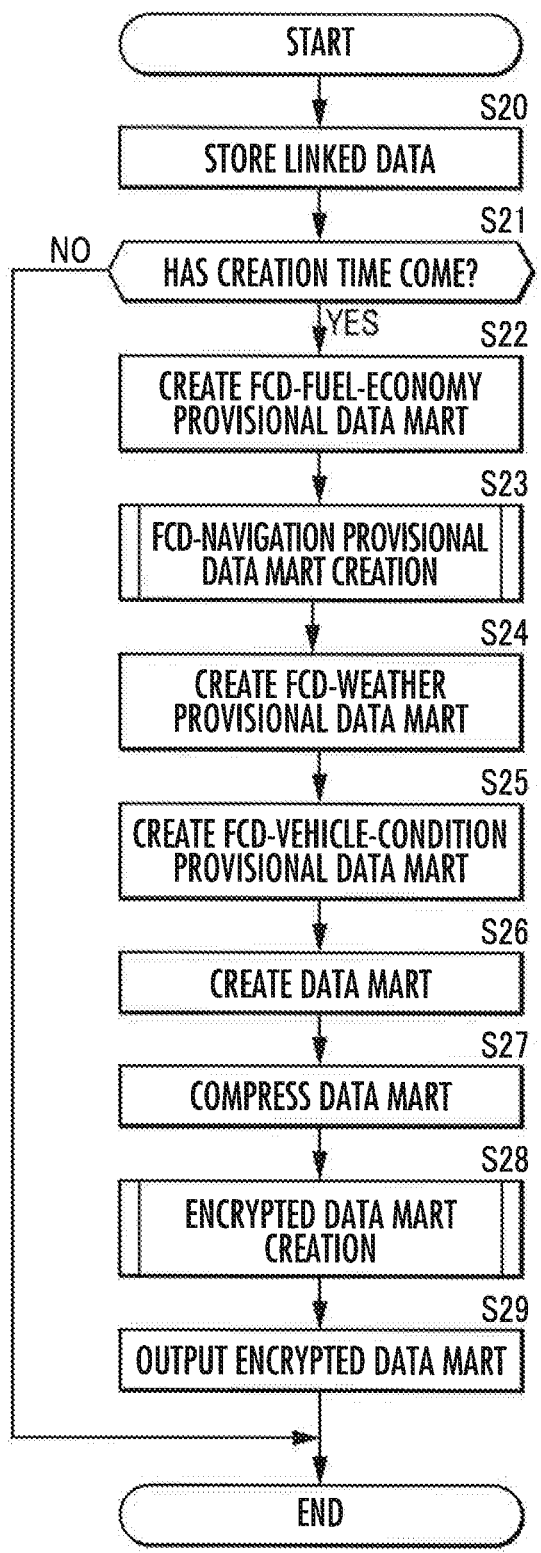
FIG. 3 is a flowchart showing a data integration process.

As shown in FIG. 3, a piece of linked data input from the data processing server 2 is first stored in a storage region (step S20 of FIG. 3).

It is then judged whether a time for encrypted data mart creation has come (step S21 of FIG. 3). The creation time is set to a predetermined time (e.g., 24:00) of a day.

If a result of the judgment is negative (NO in step S21 of FIG. 3), the present process ends without doing anything.

On the other hand, if the judgment result is affirmative (YES in step S21 of FIG. 3), an FCD-fuel-economy provisional data mart is created (step S22 of FIG. 3). The FCD-fuel-economy provisional data mart (a first data group) is created by searching for FCDs and pieces of fuel economy data for the last 30 days stored in the storage region using a user ID and a vehicle ID as a key and linking the FCDs and the pieces of fuel economy data to each other and created as a data group (map) having the user ID, the vehicle ID, an FCD, a piece of fuel economy data, a sampling time stamp of the piece of fuel economy data, and a reading time stamp of the piece of fuel economy data which are linked to one another.

An FCD-navigation provisional data mart is then created (step S23 of FIG. 3). More specifically, the creation of the FCD-navigation provisional data mart (a second data group) is executed in the manner shown in FIG. 4.

As shown in FIG. 4, the FCDs and pieces of navigation data for the last 30 days are compared using the user ID and the vehicle ID as a key, and it is judged whether each FCD coincides exactly in latitude and longitude with any piece of navigation data (step S40 of FIG. 4).

If a result of the judgment is negative (NO in step S40 of FIG. 4), i.e., if the FCD does not coincide exactly in latitude and longitude with any piece of navigation data, the FCD and one piece of navigation data which are closest in latitude and longitude are linked to each other (step S41 of FIG. 4).

On the other hand, if the judgment result is affirmative (YES in step S40 of FIG. 4), it is judged whether the number of pieces of data exactly coincident in latitude and longitude is one (step S42 of FIG. 4).

If a result of the judgment is affirmative (YES in step S42 of FIG. 4), the FCD and the coincident piece of navigation data are linked to each other (step S43 of FIG. 4).

On the other hand, if the judgment result is negative (NO in step S42 of FIG. 4), and there are a plurality of pieces of data exactly coincident in latitude and longitude, the FCD and one piece of navigation data which are closest in sampling time stamp are linked to each other (step S44 of FIG. 4).

It is judged subsequently to the above-described linking processing whether linking of all pieces of data is over (step S45 of FIG. 4). If a result of the judgment is negative (NO in step S45 of FIG. 4), the above-described processes are executed again.

On the other hand, if the judgment result is affirmative (YES in step S45 of FIG. 4), i.e., when linking of the FCDs and the pieces of navigation data for the last 30 days is over, the present process ends. With the above-described processing, the FCD-navigation provisional data mart is created as a data group (map) having the user ID, the vehicle ID, an FCD, a piece of navigation data, a sampling time stamp of the piece of navigation data, and a reading time stamp of the piece of navigation data which are linked to one another.

Referring back to FIG. 3, after the FCD-navigation provisional data mart is created in the above-described manner, an FCD-weather provisional data mart is created (step S24 of FIG. 3). More specifically, mesh codes are linked to the FCDs for the last 30 days stored in the storage region on the basis of pieces of latitude and longitude data of the FCDs. The FCDs and pieces of weather data are then compared. An FCD and a piece of weather data which are coincident in mesh code with each other are searched for, and the coincident pieces of data are linked to each other. In the above-described manner, the FCD-weather provisional data mart (a third data group) is created as a data group (map) having the user ID, the vehicle ID, a mesh code, an FCD, a piece of weather data, a sampling time stamp of the piece of weather data, and a reading time stamp of the piece of weather data which are linked to one another.

An FCD-vehicle-condition provisional data mart is created (step S25 of FIG. 3). The FCD-vehicle-condition provisional data mart (a fourth data group) is created by searching for the FCDs and pieces of vehicle condition data for the last 30 days stored in the storage region using the user ID and the vehicle ID as a key and linking the FCDs and the pieces of vehicle condition data to each other and created as a data group (map) having the user ID, the vehicle ID, an FCD, a piece of vehicle condition data, a sampling time stamp of the piece of vehicle condition data, and a reading time stamp of the piece of vehicle condition data which are linked to one another.

A data mart is created (step S26 of FIG. 3). More specifically, the data mart is created by linking the four provisional data marts created in the above-described manner to one another using a user ID and a vehicle ID as a key and created as a data group (map) having the user ID, the vehicle ID, an FCD, a piece of navigation data, a piece of weather data, a piece of vehicle condition data, a sampling time stamp, and a reading time stamp which are linked to one another.

The data mart is then compressed into data in Lzo format using the Lzo algorithm (step S27 of FIG. 3). After that, an encrypted data mart creation process is executed (step S28 of FIG. 3). More specifically, the encrypted data mart creation process is executed in the manner shown in FIG. 5.

As shown in FIG. 5, an encryption condition flag F_ENC is first read (step S50 of FIG. 5). The encryption condition flag F_ENC is set to any one of "1" to "5" in accordance with the intended use (the purpose of analysis) of the data mart (to be described below) by an administrator of the integration processing server 3.

(a) If changes in vehicle ID at a fixed location do not interfere with data analysis (e.g., if the traffic volume and the congestion degree at a specific intersection are desired to be analyzed), the encryption condition flag F_ENC is set to "1."

(b) If changes in vehicle ID for a fixed length of time do not interfere with data analysis (e.g., if the trade area of a tourist spot or a shop is desired to be analyzed), the encryption condition flag F_ENC is set to "2."

(c) If movement preferences of a user are desired to be analyzed, the encryption condition flag F_ENC is set to "3."

(d) If usage in the marketplace for each vehicle type is to be analyzed, the encryption condition flag F_ENC is set to "4."

(e) The encryption condition flag F_ENC is set to "5" for purposes other than the purposes (a) to (d).

It is then judged whether the read encryption condition flag F_ENC is "1" (step S51 of FIG. 5). If a result of the judgment is affirmative (YES in step S51 of FIG. 5), a cipher key is set to a combination of a part of a mesh code and a fixed key (step S52 of FIG. 5). The fixed key is set in advance.

On the other hand, if the judgment result is negative (NO in step S51 of FIG. 5), i.e., if F_INC≠1, it is judged whether the encryption condition flag F_ENC is "2" (step S53 of FIG. 5). If a result of the judgment is affirmative (YES in step S53 of FIG. 5), the cipher key is set to a combination of a part of a sampling time stamp of a piece of navigation data and the fixed key (step S54 of FIG. 5).

On the other hand, if the judgment result is negative (NO in step S53 of FIG. 5), i.e., if F_INC≠1,2, it is judged whether the encryption condition flag F_ENC is "3" (step S55 of FIG. 5). If a result of the judgment is affirmative (YES in step S55 of FIG. 5), the cipher key is set to a combination of a part of the user ID and the fixed key (step S56 of FIG. 5).

On the other hand, if the judgment result is negative (NO in step S55 of FIG. 5), i.e., if F_INC≠1 to 3, it is judged whether the encryption condition flag F_ENC is "4" (step S57 of FIG. 5). If a result of the judgment is affirmative (YES in step S57 of FIG. 5), the cipher key is set to a combination of a part of the vehicle ID and the fixed key (step S58 of FIG. 5).

On the other hand, if the judgment result is negative (NO in step S57 of FIG. 5), i.e., if F_INC=5, the cipher key is set to the fixed key (step S59 of FIG. 5).

After the cipher key is set in accordance with a value of the encryption condition flag F_INC, as described above, vehicle IDs and user IDs in the data mart are encrypted by a predetermined encryption algorithm (e.g., SHA-256) using the cipher key (step S60 of FIG. 5).

The encrypted data mart is created by linking a piece of vehicle type data and the encryption condition flag to the data mart having the encrypted vehicle IDs and user IDs (step S61 of FIG. 5). The piece of vehicle type data corresponds to a part of the vehicle ID. After that, the present process ends.

Referring back to FIG. 3, after the encrypted data mart creation process is executed in the above-described manner, the encrypted data mart is output to the integrated database server 4 (step S29 of FIG. 3). After that, the present process ends.

A data storage process will be described with reference to FIG. 6. The process stores an encrypted data mart input from the integration processing server 3 in the storage region in the integrated database server 4, and is executed each time an encrypted data mart is input.

As shown in FIG. 6, an encrypted data mart is first read (step S80 of FIG. 6). A vehicle type is determined on the basis of a piece of vehicle type data included in the encrypted data mart (step S81 of FIG. 6). The vehicle type that is determined will be referred to as a determined vehicle type hereinafter.

It is then judged whether the encryption condition flag F_ENC included in the encrypted data mart is "1" (step S82 of FIG. 6).

If a result of the judgment is affirmative (YES in step S82 of FIG. 6), the encrypted data mart is stored as a piece of registered data in a first region for the determined vehicle type (step S83 of FIG. 6). After that, the present process ends.

On the other hand, if the judgment result is negative (NO in step S82 of FIG. 6), i.e., if F_INC≠1, it is judged whether the encryption condition flag F_ENC is "2" (step S84 of FIG. 6).

If a result of the judgment is affirmative (YES in step S84 of FIG. 6), the encrypted data mart is stored as a piece of registered data in a second region for the determined vehicle type (step S85 of FIG. 6). After that, the present process ends.

On the other hand, if the judgment result is negative (NO in step S84 of FIG. 6), i.e., if F_INC≠1,2, it is judged whether the encryption condition flag F_ENC is "3" (step S86 of FIG. 6).

If a result of the judgment is affirmative (YES in step S86 of FIG. 6), the encrypted data mart is stored as a piece of registered data in a third region for the determined vehicle type (step S87 of FIG. 6). After that, the present process ends.

On the other hand, if the judgment result is negative (NO in step S86 of FIG. 6), i.e., if F_INC≠1 to 3, it is judged whether the encryption condition flag F_ENC is "4" (step S88 of FIG. 6).

If a result of the judgment is affirmative (YES in step S88 of FIG. 6), the encrypted data mart is stored as a piece of registered data in a fourth region for the determined vehicle type (step S89 of FIG. 6). After that, the present process ends.

On the other hand, if the judgment result is negative (NO in step S88 of FIG. 6), i.e., if F_INC=5, the encrypted data mart is stored as a piece of registered data in a fifth region for the determined vehicle type (step S90 of FIG. 6). After that, the present process ends.

As described above, in the data registration system 1 according to the present embodiment, a data mart is created as a data group having an FCD, a piece of weather data, a piece of vehicle condition data, a piece of fuel economy data, and a piece of navigation data input over the network 10 and a vehicle ID and a user ID which are linked to each other and is compressed. Additionally, an encrypted data mart is created by encrypting only vehicle IDs and user IDs in the compressed data mart by an encryption algorithm using a cypher key, and is stored as a piece of registered data in the storage region in the integrated database server 4.

In this case, a vehicle ID and a user ID are pieces of information for identification of a vehicle and a user of the vehicle and require high confidentiality. Since an encrypted data mart is created by encrypting only such pieces of data, high confidentiality required by a vehicle ID and a user ID can be appropriately ensured.

Also, an FCD, a piece of weather data, a piece of vehicle condition data, a piece of fuel economy data, and a piece of navigation data are highly effective at the time of forming pieces of data related to a vehicle into big data and analyzing the big data, and it is possible to efficiently register such highly effective data while enhancing confidentiality.

Additionally, a data mart is created by creating an FCD-fuel-economy provisional data mart, an FCD-navigation provisional data mart, an FCD-weather provisional data mart, and an FCD-vehicle-condition provisional data mart and collectively linking the provisional data marts. A load at the time of data mart creation can be made smaller than in a case where a data mart is created in one operation.

Moreover, since a data mart is encrypted after being compressed, the size of an encrypted data mart can be reduced. This allows an increase in the number of pieces of registered data which can be stored in a storage region of the same size.

Since a cypher key can be switched in accordance with the intended use of a data mart, and vehicle IDs and user IDs in the data mart are encrypted by an encryption algorithm using the switched cypher key, the level of security can be made higher than in a case using one type of cipher key. In addition, since a storage region to store an encrypted data mart as a piece of registered data is switched in accordance with a value of an encryption condition flag F_ENC, a necessary piece of registered data can be appropriately taken out from a corresponding storage region in accordance with the intended use (the purpose of analysis), and convenience can be enhanced.

Note that although the embodiment is an example which uses a vehicle ID and a user ID as a piece of vehicle-identifying data, a piece of vehicle-identifying data according to the present invention is not limited to this and may be one for identification of at least one of a vehicle and a user of the vehicle. For example, a vehicle ID or a user ID may be used as a piece of vehicle-identifying data. In this case, for example, only one of a vehicle ID and a user ID may be linked to pieces of data other than a piece of weather data, and a data mart may be created using only one of a vehicle ID and a user ID as a key in steps S22 to S26 of FIG. 3 in the linked data creation process in FIG. 2 according to the embodiment.

Also, although the embodiment is an example in which a data registration system according to the present invention is applied to a vehicle having an internal combustion engine as a power source, the data registration system according to the present invention is not limited to this and is applicable to a vehicle having something other than an internal combustion engine as a power source. For example, the data registration system according to the present invention is also applicable to a fuel cell vehicle, an electric vehicle, and the like.

Additionally, although the embodiment is an example which uses fuel economy as a piece of consumption rate data, a piece of consumption rate data according to the present invention is not limited to this and may be one which represents an energy consumption rate of a vehicle. For example, in the case of a fuel cell vehicle, a hydrogen consumption rate corresponds to a piece of consumption rate data. In the case of an electric vehicle, a power consumption rate corresponds to a piece of consumption rate data.

Although the embodiment is an example which uses LZO as a compression algorithm at the time of data mart creation, the compression algorithm at the time of data mart creation is not limited to this and may be one which can compress data. For example, Gzip or the like may be used as the compression algorithm at the time of data mart creation.

Also, although the embodiment creates a data mart by the method shown in FIG. 3, a data mart creation method is not limited to this. For example, steps S25 and S26 may be omitted from the method in FIG. 3, and a data mart may be created by linking a piece of weather data and a piece of vehicle condition data to two provisional data marts created in steps S22 and S23.

Additionally, although the embodiment is an example in which an encrypted data mart is created by encrypting vehicle IDs and user IDs in a data mart, a whole data mart or vehicle IDs and user IDs together with other pieces of data may be encrypted using a cipher key at the time of creating an encrypted data mart. In this case, a configuration in which the cipher key allows decryption of the encrypted data mart may be adopted.

Although the embodiment encrypts a data mart after compressing the data mart, a data mart may be encrypted without being compressed.

Although the embodiment is an example in which a data registration system is composed of three servers, a data registration system may be composed of one or two servers or four or more servers.

REFERENCE SIGNS LIST 1 data registration system
2 data processing server (data reception unit)
3 integration processing server (data group creation unit and encrypted data group creation unit)
4 integrated database server (data storage unit)
10 network
14 vehicle

What is claimed is:

1. A data registration system comprising:
a data processing server to which a plurality of types of data related to a vehicle and vehicle-identifying data for identification of at least one of the vehicle and an owner of the vehicle are input over a network;
an integration processing server configured to create a data group in which the plurality of types of data and the vehicle-identifying data are linked to one another, and to create an encrypted data group by encrypting at least the vehicle-identifying data in the data group using a predetermined encryption algorithm; and
an integrated database server configured to store the encrypted data group as registered data in a storage region, wherein the predetermined encryption algorithm is an encryption algorithm using a cipher key;
the integration processing server further configured to switch the cipher key in accordance with an intended use of the registered data and encrypts the vehicle-identifying data by the encryption algorithm using the switched cipher key;
the integrated database server further configured to switch the storage region that stores the encrypted data group according to a value of an encryption condition flag, wherein the encryption condition flag is set in accordance with the switched cipher key;
a first setting of the encryption condition flag configured to indicate that changes in the vehicle-identifying data at a fixed location do not interfere with data analysis;
a second setting of the encryption condition flag configured to indicate that changes in the vehicle-identifying data for a fixed length of time do not interfere with data analysis;
a third setting of the encryption condition flag configured to indicate that movement preferences of a user are to be analyzed; and
wherein a fourth setting of the encryption condition flag configured to indicate that usage in a marketplace for each of at least one vehicle type is to be analyzed.

2. The data registration system according to claim 1, wherein the plurality of types of data include vehicle movement status data representing a time-series movement status of the vehicle, consumption rate data representing an energy consumption rate of the vehicle, navigation data representing a computation result and a setting state in a navigation device of the vehicle, and weather data representing weather in a region in which the vehicle existed.

3. The data registration system according to claim 1, wherein the plurality of types of data further include vehicle condition data representing at least one of a manufacturing condition and a repair condition of the vehicle.

4. The data registration system according to claim 3, wherein the integration processing server further configured to create a first data group having the vehicle-identifying data, the vehicle movement status data, and the consumption rate data that are linked to one another, a second data group having the vehicle-identifying data, the vehicle movement status data, and the navigation data that are linked to one another, a third data group having the vehicle movement status data and the weather data that are linked to each other, and a fourth data group having the vehicle-identifying data, the vehicle movement status data, and the vehicle condition data that are linked to one another, and creates the data group using the first to fourth data groups.

5. The data registration system according to claim 1, wherein the integration processing server further configured to create the data group as a data group which is compressed by a predetermined compression algorithm.

* * * * *